United States Patent
Patel

(10) Patent No.: US 7,596,143 B2
(45) Date of Patent: Sep. 29, 2009

(54) METHOD AND APPARATUS FOR HANDLING POTENTIALLY CORRUPT FRAMES

(75) Inventor: Tejaskumar R. Patel, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 945 days.

(21) Appl. No.: 11/014,255

(22) Filed: Dec. 16, 2004

(65) Prior Publication Data

US 2006/0133378 A1   Jun. 22, 2006

(51) Int. Cl.
*H04L 12/28* (2006.01)
*H04L 12/56* (2006.01)

(52) U.S. Cl. ...................................... 370/394

(58) Field of Classification Search ........ 370/288, 370/394, 335, 452, 331, 463, 395, 465, 236, 370/329, 400, 401, 389, 352, 229, 337, 345, 370/350; 709/230, 250, 234, 228, 237, 203, 709/231, 229; 714/704, 758, 748, 746, 48, 714/747, 755, 795; 704/258, 500; 375/240, 375/331, 346, 222, 227; 455/507, 517, 410, 455/552; 379/101
See application file for complete search history.

(56) References Cited

U.S. PATENT DOCUMENTS

| | | | | |
|---|---|---|---|---|
| 4,985,895 A * | 1/1991 | Pelkey | ........................ | 714/758 |
| 5,497,383 A * | 3/1996 | Thome et al. | ................ | 714/795 |
| 6,092,230 A * | 7/2000 | Wood et al. | .................. | 714/755 |
| 6,175,875 B1 * | 1/2001 | Stapleton et al. | ............ | 709/250 |
| 6,373,842 B1 * | 4/2002 | Coverdale et al. | ........... | 370/394 |
| 6,865,163 B1 * | 3/2005 | Bergenwall et al. | ......... | 370/288 |
| 6,956,855 B1 * | 10/2005 | Chang | ......................... | 370/394 |
| 7,031,926 B2 * | 4/2006 | Mäkinen et al. | ............. | 704/500 |
| 7,145,889 B1 * | 12/2006 | Zhang et al. | ................. | 370/329 |
| 7,388,852 B2 * | 6/2008 | Zhang et al. | ................. | 370/335 |
| 2001/0027544 A1* | 10/2001 | Joncour | ....................... | 714/704 |
| 2002/0091523 A1* | 7/2002 | Makinen et al. | ............. | 704/258 |
| 2003/0023910 A1* | 1/2003 | Myler et al. | ................. | 714/704 |
| 2004/0037245 A1* | 2/2004 | Grilli et al. | .................. | 370/331 |
| 2004/0185829 A1* | 9/2004 | Vinck | .......................... | 455/410 |
| 2005/0083847 A1* | 4/2005 | Rollet | ......................... | 370/236 |
| 2006/0281485 A1* | 12/2006 | Johnson et al. | ........... | 455/552.1 |

\* cited by examiner

*Primary Examiner*—Hong Cho
*Assistant Examiner*—Prenell P Jones

(57) ABSTRACT

The present invention provides a method for handling potentially corrupted frames. The method includes receiving a frame having a first sequence number, determining, based on the first sequence number, whether the frame is potentially corrupted, and determining a number of received potentially corrupted frames in response to determining that the frame is potentially corrupted. The method also includes determining whether to drop the potentially corrupted frame based on the number of received potentially corrupted frames.

18 Claims, 3 Drawing Sheets

METHOD AND APPARATUS FOR HANDLING POTENTIALLY CORRUPT FRAMES

BACKGROUND OF THE INVENTION

1. Field of the Invention

This invention relates generally to telecommunication systems, and, more particularly, to wireless telecommunication systems.

2. Description of the Related Art

Data is transmitted between peers of a wireless telecommunications system according to one or more protocols. For example, a transmitter in a mobile unit may transmit data across an air interface to a receiver in a base station according to a Radio Link Protocol (RLP). In third-generation Code Division Multiple Access (CDMA) 2000 wireless telecommunications systems, data is transmitted over a CDMA 2000 traffic channel according to a Type 3 Radio Link Protocol (RLP). At least in part to reduce transmission overhead, wireless telecommunication protocols such as the Radio Link Protocol are typically pure negative acknowledgment (NAK) protocols. When data frames are transmitted according to a NAK protocol, the receiver does not acknowledge successfully received data frames. However, if the data frame is not received successfully, the receiver requests retransmission of the unsuccessfully received data frame.

Data frames are generally assigned a sequence number. For example, when a call session is established between two peers, the first data frame transmitted by each peer may be given a sequence number of 1. Subsequently transmitted data frames are given sequentially increasing sequence numbers. For example, the tenth frame transmitted by a transmitter in a mobile unit may be given the sequence number 10 and the $2000^{th}$ frame transmitted by a transmitter in a base station may be given the sequence number 2000. Since each peer may transmit data frames independently, the sequence numbers associated with frames transmitted by peers are not generally related in any predetermined manner.

Each peer maintains a record of various sequence numbers associated with the call session. For example, if first and second peers are communicating over an air interface according to the Type 3 RLP, both peers maintain records of various 12-bit sequence numbers (L_SEQ) associated with the call session. For example, the first peer typically stores a 12-bit sequence number indicative of the next data frame that is needed for sequential delivery of the data frames from the second peer (L_V(N)), an estimate of the 12-bit sequence number indicative of the next data frame required by the second peer for sequential delivery of data frames from the first peer (L_V(N)_peer), a 12-bit sequence number indicative of the next expected new data frame to be provided by the second peer (L_V(R)), and a 12-bit sequence number indicative of the next new data frame expected to be sent by the first peer (L_V(S)). The second peer stores a corresponding set of sequence numbers.

The frames that are transmitted and/or received by the peers also include information indicative of the sequence numbers. In Type 3 RLP, four types of frames may be exchanged between peers. Control frames include SYNC, SYNC/ACK, ACK, and/or NAK control frames. The SYNC, SYNC/ACK, and ACK control frames are exchanged during synchronization procedures to synchronize peers before beginning the data transfer. The NAK control frames are used to send a negative acknowledgment that requests a retransmission of a specified data frame to maintain integrity of the user data. The NAK control frames include at least the sequence number of the requested data frame. Data frames, which may include new and/or retransmitted data frames, include the sequence number associated with the data frame. Fill and/or idle frames may be sent periodically to inform the peers about the sender state for transmitting and/or receiving frames. Fill and/or idle frames may also be sent when no other frames are available for transmission on the associated traffic channel. The sequence number L_SEQ carried by fill frames is typically equal to the next data frame expected by the peer that transmitted the fill frame for sequential delivery of frames from the peer that receives the fill frame (L_V(N)). The sequence number L_SEQ carried by idle frames is typically equal to the sequence number of the next new data frame to be sent by the peer that transmitted the idle frame towards the peer that received the idle frame (L_V(S)).

Receivers in the peers use a rate determination algorithm to detect and/or code the received physical frames. One such physical frame is rate-⅛ physical CDMA frame containing two bytes of payload. Rate-⅛ physical CDMA frames typically do not carry any error checking bits, such as CRC bits, to detect corruption of the physical frame. The fill and idle frames carry two-byte payloads and thus only require rate-⅛ physical CDMA frames on a fundicated CDMA traffic channel. However, the fill and idle frames do not carry any CRC checks that would enable the controller to detect corruption of the fill and/or idle frames. Furthermore, a large number of fill and/or idle frames may be transmitted over the fundicated traffic channel because these frames are sent when no other frames are available for transmission on the fundicated traffic channel. The combination of a large number of fill and idle frames and the inability to detect corruption of these types of frames may result in a corrupted fill and/or idle frame being treated as a good frame.

In many cases, treating a corrupted fill and/or idle frame as a good frame causes the transmission protocol to initiate a reset procedure that initializes the RLP and performs a synchronization exchange procedure. For example, in the Type 3 RLP, the peer performs the reset procedure if the value of L_SEQ indicated by the corrupted bits in the idle frame is less than L_V(N). For another example, the peer performs the reset procedure when the value of L_V(N)_peer computed using the corrupted fill frame is greater than L_V(S). For yet another example, if the value of L_SEQ indicated by the corrupted idle frame is larger than L_V(R), the receiving peer sends a negative acknowledgment requesting retransmission of the frames between the sequence numbers L_V(R) and L_SEQ from the peer that sent the idle frame. Since these frames were never sent by the peer that sent the idle frame, this peer initiates the reset procedure.

Resets may cause unnecessary degradation in user level throughput for data services in a wireless telecommunications system, which may also degrade the overall performance and efficiency of the wireless telecommunications system. For example, all send and receive state variables may be reset to zero during the reset procedure. Resequencing buffers may also be cleared and data frames queued for retransmission may be discarded. If data compression is used by the wireless telecommunications system, clearing of the queued data frames and resetting the send/receive states may cause the PPP data compression history to become corrupted, resulting in additional user data loss. The Van Jacobson TCP/IP header compression history may also be corrupted, resulting in user data loss for TCP-based applications.

The present invention is directed towards addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for handling potentially corrupted frames. The method includes receiving a frame having a first sequence number, determining, based on the first sequence number, whether the frame is potentially corrupted, and determining a number of received potentially corrupted frames in response to determining that the frame is potentially corrupted. The method also includes determining whether to drop the frame based on the number of received potentially corrupted frames.

BRIEF DESCRIPTION OF THE DRAWINGS

The invention may be understood by reference to the following description taken in conjunction with the accompanying drawings, in which like reference numerals identify like elements, and in which.

Figure 1:
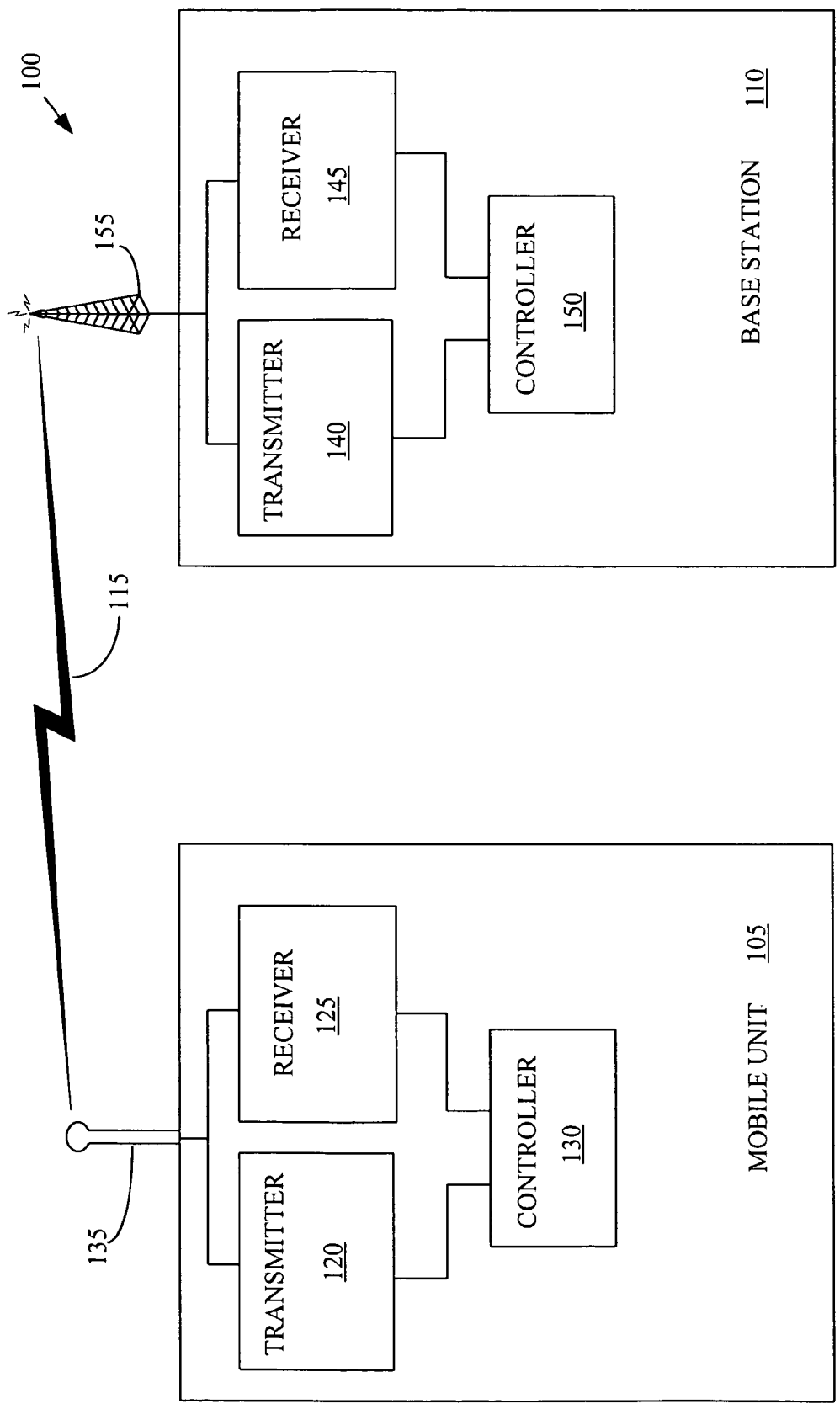
FIG. 1 shows a wireless telecommunication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, a wireless telecommunication system 100 is shown. In the illustrated embodiment, the wireless telecommunications system 100 includes a mobile unit 105 and a base station 110. In accordance with common usage in the art, both the mobile unit 105 and the base station 110 may be referred to as peers (or peer devices) within the wireless telecommunication system 100. Persons of ordinary skill in the art should appreciate that the wireless telecommunication system 100 is not limited to two peers, i.e. a mobile unit 105 and the base station 110. In alternative embodiment, any desirable number of peers may be included in the wireless telecommunication system 100. Furthermore, the peers may include any desirable number of mobile units 105 and/or base stations 110, as well as any other desirable type of device.

The mobile unit 105 and the base station 110 communicate via an air interface 115. The air interface 115 may be established according to any desirable protocol including, but not limited to, a Universal Mobile Telecommunication System (UMTS) protocol, a Global System for Mobile communications (GSM) protocol, a Code Division Multiple Access (CDMA) protocol, and the like. The particular protocol used by the mobile unit 105 and the base station 110 to communicate over the air interface 115 is a matter of design choice and not material to the present invention. Accordingly, only those aspects of the operation of the air interface 115 that are relevant to the present invention will be described in detail below.

The mobile unit 105 includes a transmitter 120, a receiver 125, and a controller 130. The transmitter 120 is capable of transmitting signals over the air interface 115. In one embodiment, the transmitter 120 may transmit one or more encoded messages provided by the controller 130 using an antenna 135. For example, the transmitter 120 may be a radio transmitter capable of transmitting encoded messages over the air interface 115 according to a Type 3, Radio Layer Protocol (RLP). The receiver 125 is capable of receiving signals over the air interface 115. In one embodiment, the receiver 125 receives encoded messages over the air interface 115 and provides the encoded messages to the controller 130 for decoding, e.g. according to a Type 3, Radio Layer Protocol (RLP). Although the transmitter 120, the receiver 125, and the controller 130 are depicted as separate entities in FIG. 1, persons of ordinary skill in the art should appreciate that the present invention is not so limited. In alternative embodiments, portions of the transmitter 120, the receiver 125, and/or the controller 130 may be implemented in any desirable number of entities.

The base station 110 includes a transmitter 140, a receiver 145, and a controller 150. The transmitter 140 is capable of transmitting signals over the air interface 115. In one embodiment, the transmitter 140 may transmit one or more encoded messages provided by the controller 150 using a radio tower 155. For example, the transmitter 140 may be a radio transmitter capable of transmitting encoded messages over the air interface 115 according to a Type 3, Radio Layer Protocol (RLP). The receiver 145 is capable of receiving signals over the air interface 115. In one embodiment, the receiver 145 receives encoded messages over the air interface 115 and provides the encoded messages to the controller 150 for decoding, e.g. according to a Type 3, Radio Layer Protocol (RLP). Although the transmitter 140, the receiver 145, and the controller 150 are depicted as separate entities in FIG. 1, persons of ordinary skill in the art should appreciate that the present invention is not so limited. In alternative embodiments, portions of the transmitter 140, the receiver 145, and/or the controller 150 may be implemented in any desirable number of entities.

The mobile unit 105 and the base station 110 can transmit a variety of frames over the air interface 115. For example, if the air interface 115 operates according to the Type 3 RLP, four types of frames may be exchanged between the mobile unit 105 and the base station 110: control frames, data frames, fill frames, and idle frames. Control frames include SYNC, SYNC/ACK, ACK, and/or NAK control frames. The SYNC, SYNC/ACK, and ACK control frames are exchanged during synchronization procedures to synchronize the mobile unit 105 and the base station 110 before beginning the data transfer over the air interface 115. The NAK control frames are used to send a negative acknowledgment that requests a retransmission of a specified data frame for maintaining integrity of the user data. Data frames, which may include new and/or retransmitted data frames, include various types of data, such as voice packets, text messages, and the like. Fill and/or idle frames may be sent periodically to inform the peers about the sender state for transmitting and/or receiving frames. Fill and/or idle frames may also be sent when no other frames are available for transmission on the associated traffic channel.

At least in part to keep track of which data frames have been successfully received and which may need to be retransmitted, data frames are assigned a sequence number by the transmitting peer. The mobile unit 105 and the base station 110 may transmit data frames largely independently and so there may be no relation between the sequence numbers provided by the mobile unit 105 and the base station 110. For example, the mobile unit 105 assigns a sequence number of 10 to the 10th data frame transmitted by the transmitter 120 during a call session with the base station 110. For another example, the base station 110 may assign a sequence number of 15 to the 15th data frame transmitted by the transmitter 140 during a call session with the mobile unit 105. The various types of frames may include information indicative of one or more of the sequence numbers. For example, data frames may include a sequence number L_SEQ associated with the data frame. For another example, fill frames may include information indicative of a sequence number L_SEQ that is equal to the next data frame expected by the peer that transmitted the fill frame for sequential delivery of data frames from the peer that received the fill frame (sometimes referred to as L_V(N)). For yet another example, idle frames may contain information indicative of a sequence number L_SEQ that is equal to the next data frame expected to be sent by the peer that transmitted the idle frame towards the peer that received the idle frame (sometimes referred to as L_V(S)).

The frames that are transmitted over the air interface 115 may be corrupted during encoding, transmission, decoding, or any other processing associated with the frames. In some instances, corruption may be due to a random or transient event, such as fading of the air interface 115, and therefore may only affect a small number of data frames. Accordingly, it may not be desirable to reset the peer devices in response to corruption of the frame. However, in other instances, corruption of the frames may be due to some fault in one of the peer devices. For example, the peer devices may become unsynchronized, leading to corruption of a relatively large number of data frames. Accordingly, it may be desirable to reset the peer devices so that they may be resynchronized.

Figure 2:
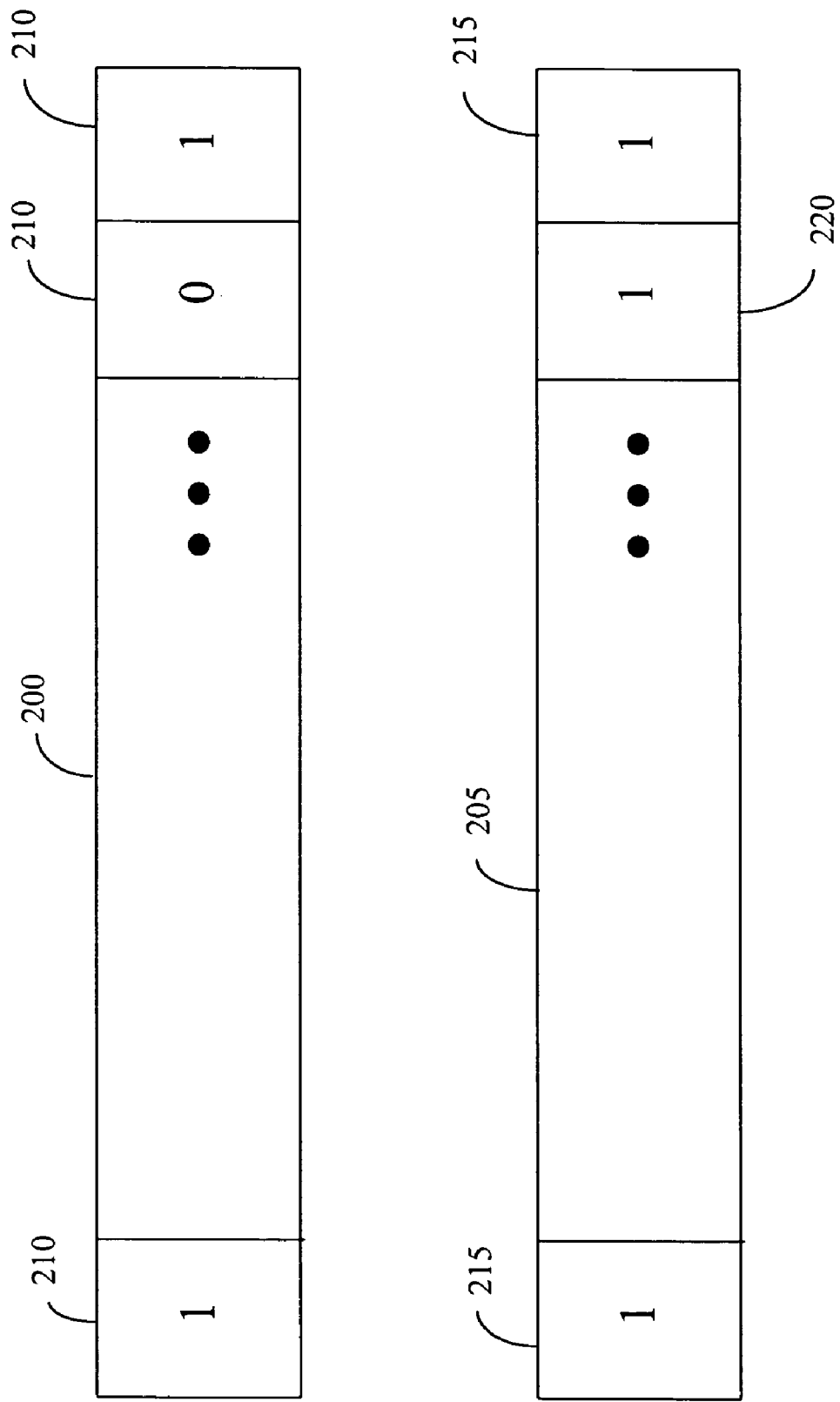
FIG. 2 conceptually illustrates an exemplary embodiment of a data frame and a corrupted data frame.

FIG. 2 conceptually illustrates an exemplary embodiment of a frame 200 and a corrupted frame 205. The frame 200 includes a plurality of slots 210 that may include information indicative of a symbol or a bit. For example, a fill or idle frame in the Type 3 RLP includes slots 210 including information indicative of approximately two bytes of information. The fill and idle frames may not carry any error-checking bits, such as Cyclic Redundancy Check (CRC) bits and the like. The frame 200 is then encoded by a first peer, transmitted over an air interface to a second peer, and decoded by the second peer to form a received frame 205 including a plurality of slots 215 including information indicative of the symbol or the bits in the slots 210 of the frame 200. However, as discussed above, the received frame 205 may be corrupted and thus include one or more corrupted slots 220. For example, a slot 210 in the transmitted frame 200 may include information indicative of a bit having a value of "1," whereas the corrupted slots 220 may include information indicative of a bit having a value of "0."

Referring back to FIG. 1, corruption of a frame as it is transmitted over the air interface 115 may alter information indicative of the sequence number carried by the frame. For example, if a fill and/or idle frame is corrupted, the information indicative of the sequence number L_SEQ carried by the fill and/or idle frame may be changed. Accordingly, the mobile unit 105 and/or the base station 110 may store one or more sequence numbers that may be used to determine whether a received frame is potentially corrupted. In one embodiment, if a communication session is established between a first peer and a second peer, each peer may store a 12-bit sequence number indicating the next data frame expected by the peer for sequential delivery of the data frames from the other peer, referred to hereinafter as L_V(N). For example, the mobile unit 105 may store a 12-bit sequence number indicating the next data frame expected so that data frames are transmitted sequentially from the base station 110 to the mobile unit 105. Each peer may also store an estimate of the value of L_V(N) stored on the other peer, referred to hereinafter as L_V(N)_peer. The peers may also store 12-bit sequence numbers indicative of the next expected new data frame from the other peer (referred to hereinafter as L_V(R)) and the next new data frame expected to be sent towards the other peer (referred to hereinafter as L(V(S)). However, persons of ordinary skill in the art should appreciate that the peers may store any desirable combination of sequence numbers or other parameters determined based upon the sequence numbers.

The controllers 130, 150 in the mobile unit 105 and the base station 110, respectively, are able to determine whether or not to drop one or more potentially corrupted frames. In one embodiment, a peer receives a frame having a first sequence number. For example, the receiver 125 in the mobile unit 105 may receive a fill and/or idle frame transmitted by the base station 110. The controller 130 may then use the first sequence number to determine whether the frame is potentially corrupted. Various techniques for determining whether or not the frame is potentially corrupted will be described in detail below. If the frame is potentially corrupted, the peer determines a number of received potentially corrupted frames and decides whether to drop the frame based on the number of received potentially corrupted frames, as will be discussed in detail below.

Figure 3:
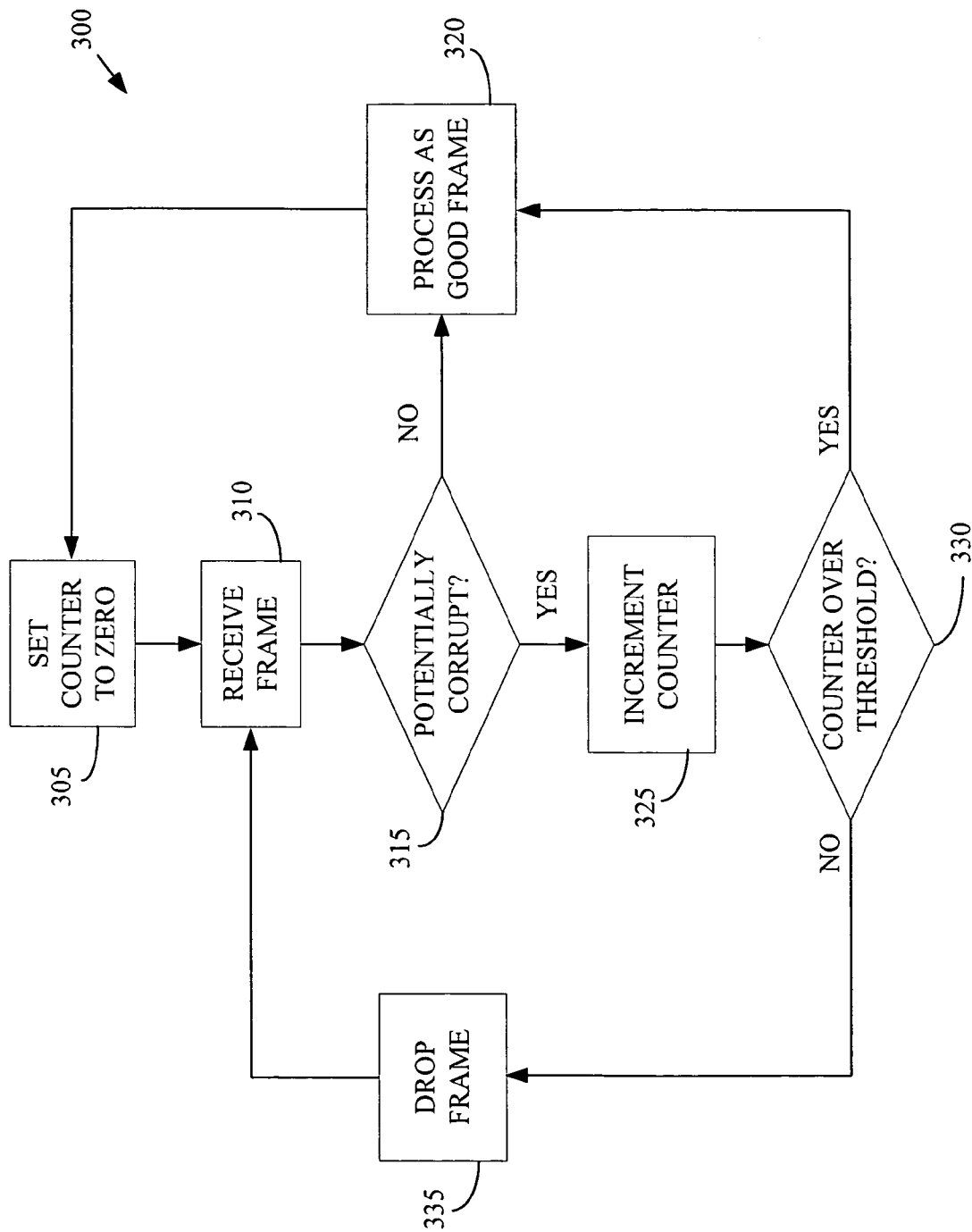
FIG. 3 conceptually illustrates one exemplary embodiment of a method for dropping potentially corrupted frames, in accordance with the present invention.

FIG. 3 conceptually illustrates one exemplary embodiment of a method 300 for dropping potentially corrupted frames. In the illustrated embodiment, at least one counter is set (at 305) to zero when a communication session is established between two peers. For example, when a communication session is established between the mobile unit 105 and the base station 115 shown in FIG. 1, counters in the controllers 130, 150 are set (at 305) to zero.

A frame, such as a fill and/or idle frame, is received (at 310). The receiving peer determines (at 315) whether the received frame is potentially corrupted. In one embodiment, the receiving peer determines (at 315) that the received frame is potentially corrupted if the sequence number of the received frame, such as an idle frame, is less than the value of L_V(N) stored by the receiving peer. In another embodiment, the receiving peer determines (at 315) that the received frame is potentially corrupted if the sequence number of the received frame, such as an idle frame, is larger than the sum of L_V(R) and an adjustable guard parameter. For example, the receiving peer may determine (at 315) that the received frame is potentially corrupted if the sequence number of the received frame is larger than L_V(R)+64. However, persons of ordinary skill in the art should appreciate that the value of the adjustable guard parameter is a matter of design choice. Lower values of the adjustable guard parameter may provide higher protection against corruption but may also increase a probability of a false detection of a potentially corrupted frame. In another embodiment, the receiving peer determines (at 315) that the received frame, such as a fill frame, is potentially corrupted when a value of L_V(N)_peer computed based upon a sequence number carried in the received frame is greater than L_V(S). Persons of ordinary skill in the art should appreciate that the above embodiments are intended to be illustrative and not to limit the present invention. In alternative embodiments, other techniques for determining (at 315) whether a received frame is potentially corrupted may be used.

If the receiving peer determines (at 315) that the received frame is not potentially corrupted, the received frame is processed (at 320) as a good frame and the appropriate counter is set (at 305) to zero. If the receiving peer determines (at 315) that the received frame is potentially corrupted, the appropriate counter is incremented (at 325). If the receiving peer determines (at 330) that the counter is less than or equal to a predetermined threshold, then the potentially corrupted frame is dropped (at 335). The receiving peer may then receive (at 310) another frame. If the receiving peer determines (at 330) that the counter is larger than the predetermined threshold, then the potentially corrupted frame is processed (at 320) as a good frame and the appropriate counter is set (at 305) to zero. For example, the predetermined threshold may be set equal to 2 so that two potentially corrupted frames may be dropped (at 335) before a potentially corrupted frame is allowed to be processed (at 320) as a good frame. However, persons of ordinary skill in the art should appreciate that the value of the predetermined threshold may be set to any desirable value. For example, increasing the value of the predetermined threshold may provide higher protection against corrupted frames but may also cause the receiving peer to be slower in responding to genuine errors.

Implementing one or more embodiments of the present invention may improve the overall performance and efficiency of wireless telecommunications between peer devices. For example, the number of resets caused by processing a corrupted frame as a good frame may be reduced, which may also reduce degradation in the user level throughput for data services in a wireless telecommunications system caused by unnecessarily resetting all send and receive state variables to zero, clearing re-sequencing buffers, discarding data frames queued for retransmission. Furthermore, if data compression is used by the wireless telecommunications system, the present invention may reduce unnecessary clearing of the queued data frames and resetting of send/receive states. Accordingly, the likelihood that a PPP data compression history and/or a Van Jacobson TCP/IP header compression history may become corrupted, resulting in additional user data loss, may be reduced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
receiving, at a node of a wireless communication system, a frame having a first sequence number;
determining, at the node and based on the first sequence number, whether the frame is potentially corrupted;
incrementing a number of received potentially corrupted frames in response to determining that the frame is potentially corrupted, said number being stored in the node; and
treating the potentially corrupted frame as a good frame when the number of received potentially corrupted frames is greater than a threshold value.

2. The method of claim 1, wherein receiving the frame comprises receiving a frame that does not carry error check bits.

3. The method of claim 1, wherein receiving the frame comprises receiving at least one of a fill and an idle frame.

4. The method of claim 1, wherein determining whether the frame is potentially corrupted comprises comparing the first sequence number to a second sequence number.

5. The method of claim 4, wherein comparing the first sequence number to the second sequence number comprises comparing the first sequence number to a sequence number expected for sequential delivery of the data frames.

6. The method of claim 5, wherein determining whether the frame is potentially corrupted comprises determining that the frame is potentially corrupted when the first sequence number is less than the second sequence number.

7. The method of claim 4, wherein comparing the first sequence number to the second sequence number comprises comparing the first sequence number to a sequence number expected to be carried by a subsequent data frame.

8. The method of claim 7, wherein comparing the first sequence number to the sequence number expected to be carried by a subsequent data frame comprises determining if the first sequence number is larger than a sum of the sequence number expected to be carried by the subsequent data frame and an adjustable parameter.

9. The method of claim 8, wherein determining a whether the frame is potentially corrupted comprises determining that the frame is potentially corrupted when the first sequence number is larger than the sum of the sequence number expected to be carried by the subsequent data frame and the adjustable parameter.

10. The method of claim 1, wherein determining whether the frame is potentially corrupted comprises:
determining a second sequence number based upon the first sequence number; and
comparing the second sequence number to a third sequence number.

11. The method of claim 10, wherein determining the second sequence number based upon the first sequence number comprises determining an estimate of the next data frame required by a peer device for sequential delivery based upon the first sequence number.

12. The method of claim 10, wherein comparing the second sequence number to the third sequence number comprises comparing the second sequence number to a sequence number indicative of the next data frame to be transmitted.

13. The method of claim 10, wherein determining whether the received frame is potentially corrupted comprises determining that the received frame is potentially corrupted if the second sequence number is greater than the third sequence number.

14. The method of claim 1, wherein incrementing the number of received potentially corrupted frames comprises incrementing a counter in the node in response to determining that the frame is potentially corrupted.

15. The method of claim 14, wherein incrementing the number of received potentially corrupted frames comprises setting the counter to zero in response to the counter exceeding a threshold value.

16. The method of claim 1, comprising determining whether to drop the frame based on the number of received potentially corrupted frames.

17. The method of claim 16, wherein determining whether to drop the frame based on the number of received potentially corrupted frames comprises determining whether to drop the frame based on a comparison of the number of received potentially corrupted frames and the threshold value.

18. The method of claim 17, comprising dropping the frame in response to determining that the number of received potentially corrupted frames is less than or equal to the threshold value.

* * * * *

UNITED STATES PATENT AND TRADEMARK OFFICE
CERTIFICATE OF CORRECTION

PATENT NO. : 7,596,143 B2  Page 1 of 1
APPLICATION NO. : 11/014255
DATED : September 29, 2009
INVENTOR(S) : Tejaskumar R. Patel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1321 days.

Signed and Sealed this

Twenty-eighth Day of September, 2010

David J. Kappos
*Director of the United States Patent and Trademark Office*